United States Patent
Thiessen

(10) Patent No.: US 9,832,933 B2
(45) Date of Patent: Dec. 5, 2017

(54) METHOD AND SYSTEM FOR GRAIN BIN AERATION

(71) Applicant: Lester James Thiessen, Neilburg (CA)

(72) Inventor: Lester James Thiessen, Neilburg (CA)

(*) Notice: Subject to any disclaimer, the term of this patent is extended or adjusted under 35 U.S.C. 154(b) by 596 days.

(21) Appl. No.: 14/305,330

(22) Filed: Jun. 16, 2014

(65) Prior Publication Data

US 2014/0378044 A1    Dec. 25, 2014

Related U.S. Application Data

(60) Provisional application No. 61/836,873, filed on Jun. 19, 2013.

(51) Int. Cl.
| | |
|---|---|
| *B65D 88/74* | (2006.01) |
| *A01F 25/08* | (2006.01) |
| *A01F 25/22* | (2006.01) |
| *B65D 88/28* | (2006.01) |
| *B65D 83/06* | (2006.01) |

(52) U.S. Cl.
CPC .............. *A01F 25/08* (2013.01); *A01F 25/22* (2013.01); *B65D 88/742* (2013.01); *B65D 88/745* (2013.01); *B65D 83/06* (2013.01); *B65D 88/28* (2013.01)

(58) Field of Classification Search
CPC ....... A01F 25/08; A01F 25/22; B65D 88/742; B65D 88/741; B65D 88/745; B65D 88/747; B65D 88/08; B65D 88/26; B65D 88/28; B65D 83/06
USPC ............ 454/181, 175, 177–180; 34/366, 413
See application file for complete search history.

(56) References Cited

U.S. PATENT DOCUMENTS

| | | | | |
|---|---|---|---|---|
| 82,432 A | * | 9/1868 | Mills et al. .......... | B65D 88/742 34/171 |
| 839,689 A | * | 12/1906 | Williams ............. | B65D 88/742 34/211 |
| 1,119,941 A | * | 12/1914 | Elliott ................. | B65D 88/742 454/177 |
| 1,328,132 A | * | 1/1920 | Dickelman ............ | A01F 25/08 454/175 |
| 1,817,270 A | * | 8/1931 | Rowles ..................... | F24F 7/04 454/175 |
| 1,981,436 A | * | 11/1934 | Shodron ................. | A01F 25/08 34/225 |

(Continued)

FOREIGN PATENT DOCUMENTS

| | | | | |
|---|---|---|---|---|
| GB | 696160 A | * | 8/1953 | ............. A01F 25/22 |
| JP | 2010124750 A | * | 6/2010 | |

*Primary Examiner* — Gregory Huson
*Assistant Examiner* — Daniel E Namay
(74) *Attorney, Agent, or Firm* — Ryan W. Dupuis; Ade & Company Inc.

(57) ABSTRACT

A grain bin aeration system has inlet ducting in communication with the hollow interior of the storage bin adjacent a perimeter of the storage bin and exhaust ducting in communication with the hollow interior of the storage bin at a central location within the storage bin. A first portion of the inlet ducting is directed to the top end of the bin so that aeration flow therethrough is directed downwardly through the material in the storage bin to the exhaust ducting. A second portion of the inlet ducting is directed to the bottom end of the bin so that aeration flow therethrough is directed upwardly through the material in the storage bin to the exhaust ducting.

18 Claims, 3 Drawing Sheets

(56) References Cited

U.S. PATENT DOCUMENTS

| | | | | |
|---|---|---|---|---|
| 1,995,551 | A * | 3/1935 | Shodron | A01F 25/08 34/225 |
| 2,000,103 | A * | 5/1935 | Shodron | A01F 25/08 34/225 |
| 2,466,362 | A * | 4/1949 | Blake | F26B 9/103 236/44 R |
| 2,805,802 | A * | 9/1957 | Strong | B01F 5/242 222/564 |
| 2,856,838 | A * | 10/1958 | Mack | A01F 25/08 454/181 |
| 3,041,684 | A * | 7/1962 | Dawson | A23B 9/18 34/225 |
| 3,097,916 | A * | 7/1963 | Dawson | B65D 88/742 34/218 |
| 3,196,774 | A * | 7/1965 | Kripal | B65D 88/742 34/191 |
| 3,199,434 | A * | 8/1965 | Piel | B65D 88/742 34/174 |
| 3,656,717 | A * | 4/1972 | Klein | B65D 88/742 366/106 |
| 4,009,520 | A | 3/1977 | Sukup | |
| 4,142,302 | A | 3/1979 | Primus | |
| 4,521,977 | A * | 6/1985 | Graff | B29B 13/065 34/169 |
| 5,960,558 | A * | 10/1999 | Bourgault | F26B 9/063 34/491 |
| 7,004,401 | B2 * | 2/2006 | Kallestad | A01F 25/22 236/49.3 |
| 7,818,894 | B2 | 10/2010 | Noyes et al. | |
| 8,124,009 | B2 * | 2/2012 | Danchenko | A23B 9/025 137/338 |
| 8,533,972 | B2 * | 9/2013 | Hubbard, Jr. | B01D 1/18 106/789 |
| 2007/0234587 | A1 * | 10/2007 | Pierson | F26B 9/103 34/168 |
| 2008/0006334 | A1 * | 1/2008 | Davidson | B33Y 30/00 137/571 |
| 2009/0094853 | A1 * | 4/2009 | Noyes | F26B 9/103 34/233 |
| 2009/0223078 | A1 * | 9/2009 | Penner | F26B 9/103 34/219 |
| 2010/0322721 | A1 * | 12/2010 | Hamel | B65D 88/28 406/146 |
| 2011/0183597 | A1 * | 7/2011 | Schreiner | A01F 25/22 454/175 |
| 2011/0219638 | A1 | 9/2011 | Schreiner | |
| 2012/0047762 | A1 * | 3/2012 | Neufeld | F26B 17/1425 34/218 |
| 2012/0102776 | A1 * | 5/2012 | Varro | F26B 17/1408 34/218 |
| 2014/0255133 | A1 * | 9/2014 | Wilkinson | B04C 5/185 414/291 |
| 2016/0376096 | A1 * | 12/2016 | Thiessen | B65D 88/745 454/180 |

* cited by examiner

METHOD AND SYSTEM FOR GRAIN BIN AERATION

This application claims the benefit under 35 U.S.C. 119(e) of U.S. provisional application Ser. No. 61/836,873, filed Jun. 19, 2013.

FIELD OF THE INVENTION

The present invention relates to a system and method for aerating a grain bin, and more particularly the present invention relates to a grain bin aeration system for directing an airflow downwardly through the grain in the bin.

BACKGROUND

To prevent undesirable spoilage of grain and other organic materials while stored in grain storage bins, it is known to be desirable aerate the grain by using a blower to force and air flow through the storage bin. Examples of prior art grain bin aeration systems are disclosed in U.S. Pat. No. 4,009,520 by Sukup, U.S. Pat. No. 7,818,894 by Noyes et al, and U.S. 2011/0219638 by Schreiner. In each instance in the prior art blowers are used to force the airflow upwardly through the grain for being exhausted at the top end of the bin. Due to moist air being denser, the heavier moist air naturally settles towards the bottom of the grain bin. Accordingly known blower arrangement are inefficient in that the blower must force the heavier moist air settled at the bottom of the bin upwardly through the entire contents of the bin to be exhausted at the top end.

U.S. Pat. No. 4,142,302 by Primus discloses another example of a grain drying system, but the system requires two bins to be operated in tandem such that it is not adaptable to existing bin structures. Furthermore, the drying step occurs primarily in a first bin where the blower is again oriented in a manner where it must inefficiently force the denser moist air upwardly through the grain.

SUMMARY OF THE INVENTION

According to one aspect of the invention there is provided a method of aerating an organic particulate material stored within a hollow interior of a storage bin, the method comprising:

directing an aerating flow into the hollow interior of the storage bin at a location adjacent a perimeter of the storage bin at one or more locations spaced upwardly from a bottom end of the storage bin; and exhausting said aerating flow externally from the hollow interior of the storage bin adjacent the bottom end of the storage bin such that the aerating flow is directed primarily downwardly through the organic particulate material.

By injecting air into the bin adjacent the perimeter, some crossflow is permitted from the perimeter incoming airflow towards the central discharge airflow which is a downward flow. The downward forced airflow through the grain provides a much shorter route for the denser moist air to be exhausted from the bin for using the blower in a more efficient manner than many prior art aeration systems.

Preferably the aerating flow is only exhausted through the bottom end of the storage bin.

The flow into the bin is preferably through the bottom end of the bin towards the top end of the bin alongside the perimeter of the storage bin, for example by providing passageways extending upwardly alongside an inner surface of a perimeter wall of the storage bin from the bottom end towards the top end through which the airflow can be introduced into the bin. The passageways preferably communicate with the interior of the storage bin at a plurality of vertically and circumferentially spaced apart locations about the perimeter of the storage bin for introducing the incoming airflow from the blower therethrough. Preferably a primary portion of the aerating flow is directly into the interior of the storage bin all the way through the passageways towards the top end of the storage bin to be subsequent redirected by the sealed top end of the bin downwardly through the center of the bin.

Preferably an exhaust duct extends downwardly within the hollow interior of the storage bin at a central location through which the airflow can be downwardly exhausted from the bin. The exhaust duct may comprise a perforated tube.

When the storage bin comprises a hopper bottom having a central discharge opening, preferably the exhaust duct extends downwardly within the hollow interior in communication through the hopper bottom at a location spaced from the central discharge opening of the hopper bottom.

According to a second aspect of the present invention there is provided an aeration system in combination with a storage bin for aerating an organic particulate material stored within a hollow interior of the storage bin, the storage bin comprising a hopper bottom wall spanning a bottom side of the hollow interior, an upright wall extending upwardly from the hopper bottom wall about a perimeter of the hollow interior, a top wall enclosing a top end of the hollow interior, the system comprising:

inlet ducting in communication with the hollow interior of the storage bin adjacent a perimeter of the storage bin at one or more locations spaced upwardly from a bottom end of the storage bin;

exhaust ducting in communication with the hollow interior of the storage bin at a central location within the storage bin and being exhausted externally of the storage bin; and a blower coupled to the inlet ducting so as to be arranged to direct an aerating flow into the hollow interior of the storage bin through the inlet ducting;

the exhaust ducting being located relative to the inlet ducting such that the aerating flow is directed primarily downwardly through organic particulate material in the hollow interior of the storage bin from the inlet ducting to the outlet ducting.

Preferably the exhaust ducting comprises a perforated portion at said central location within the storage bin and an exhaust portion communicating from the perforated portion to an exterior of the storage bin. Preferably the exhaust portion is oriented to direct exhaust flow downwardly therethrough from said central location within the bin to an exterior of the storage bin. The exhaust ducting is preferably exhausted externally from the storage bin through the hopper bottom wall at a location offset laterally outwardly from said central location.

Preferably the inlet ducting includes a plurality of upright channels extending upwardly along the upright wall of the storage bin at circumferentially spaced apart positions which are in communication with the blower so as to be arranged to direct respective portions of the aerating flow upwardly therethrough towards a top end of the storage bin. The upright channels may be substantially non-perforated so as to be arranged to direct the aerating flow upwardly therethrough primarily to the top end of the storage bin.

Each upright channel may further include at least one ventilating opening formed therein at an intermediate location spaced below the top end thereof. In this instance each ventilating opening may include a hooded portion projecting from the respective channel into the hollow interior of the storage bin above the ventilating opening so as to be arranged to direct airflow through the ventilating opening downwardly and laterally inwardly.

The inlet ducting may further include a plurality of lateral channels extending downwardly along the hopper bottom of the storage bin from an outer end at the perimeter of the hollow interior. The outer end of each lateral channel is preferably in communication with the blower so as to be arranged to direct respective portions of the aerating flow downwardly and laterally inwardly through the lateral channels towards the hollow interior of the storage bin. The lateral channels are preferably perforated.

More particularly the inlet ducting preferably comprises: i) a first portion in communication with the hollow interior of the storage bin above said central location so as to direct a first portion of the aerating flow from the blower downwardly through the hollow interior of the storage bin from the first portion of the inlet ducting to the exhaust ducting; and ii) a second portion in communication with the hollow interior of the storage bin below said central location so as to direct a second portion of the aerating flow from the blower upwardly through the hollow interior of the storage bin from the second portion of the inlet ducting to the exhaust ducting.

In the illustrated embodiment, the first portion of the inlet ducting has greater communication with the hollow interior of the storage bin than the second portion of the inlet ducting such that the aerating flow is directed primarily downwardly through organic particulate material in the hollow interior of the storage bin.

Various embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
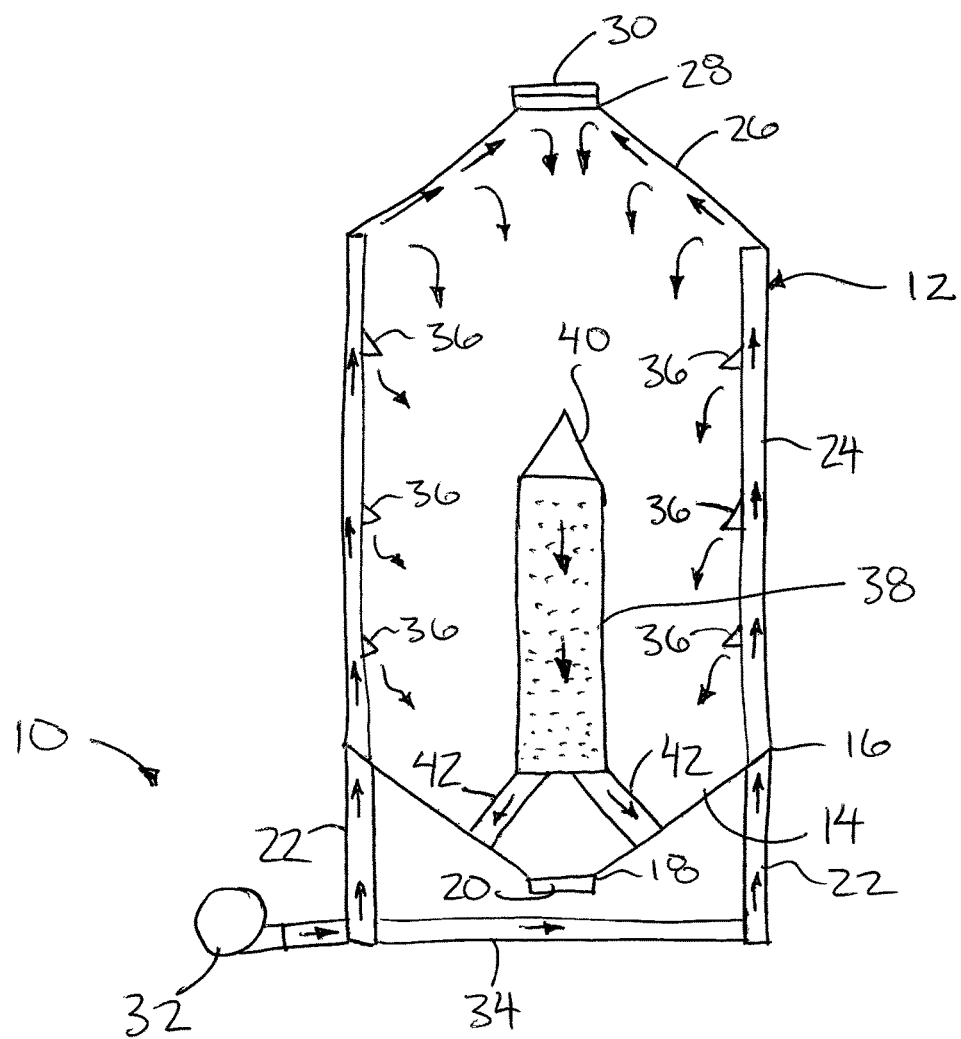
FIG. 1 is schematic representation of the aeration system according to a first embodiment of the present invention shown installed on a hopper bottom grain storage bin.

Referring to the accompanying figures, there is illustrated an aeration system generally indicated by reference numeral 10. The system 10 is particularly suited for use with a hopper bottom grain storage bin 12 as illustrated in the accompanying figure. More particularly, the system is arranged for directing a flow of ventilation air downwardly through the organic particulate material stored in the bin for exhausting moisture and air out of the bottom of the bin.

Although various embodiments of the aeration system are shown in the accompanying figures, the common features of the various embodiments will first be described.

In both of the illustrated embodiments, the storage bin 12 comprises a hopper bottom wall 14 which is generally conical in shape so as to taper downwardly and inwardly from a circular top edge 16 to a central discharge opening 18 at the bottom end. A suitable gate assembly 20 is mounted across the central discharge opening in the usual manner for operation between an open condition for discharging contents of the bin through the discharge opening 18 and a closed position in which the discharge opening is fully enclosed to retain material within the bin.

A plurality of support legs 22 are vertically oriented at circumferentially spaced positions about the perimeter of the hopper bottom wall to support the bottom wall spaced upwardly above the ground. Each of the legs 22 comprises a hollow tubular member defining a duct or passage therethrough as described in further detail below.

The bin further includes a cylindrical side wall which extends vertically upward from the top edge 16 of the hopper bottom wall to a top end which is spaced vertically thereabove to define a perimeter of the bin.

The bin further includes a top wall 26 supported on the top end of the cylindrical side wall 24. The top wall comprises an inverted cone shape extending upwardly and inwardly from a bottom circular edge mounted on top of the side wall to a central inlet opening 28 at the top end.

A lid 30 is provided for mounting across the central inlet opening 28 for operation between an open position permitting contents to be discharged into the bin through the unobstructed inlet opening and a closed position in which the inlet opening is enclosed by the lid.

According to the present invention, the lid 30 is further arranged to be sealed in relation to the perimeter of the central inlet opening 28 such that the lid and the top wall 26 collectively form an air-tight enclosure fully enclosing the top end of the bin in the closed position.

The aeration system 10 is comprised primarily of i) inlet ducting for introducing air into the interior of the bin, including at a perimeter of the bin and at various heights spaced upwardly from the bottom of the bin, ii) exhaust ducting for exhausting air downwardly through the bottom end of the bin from a central location within the hollow interior of the storage bin, and iii) a blower 32 for providing a supply of ventilation air into the bin through the inlet ducting to be subsequently exhausted by the exhaust ducting.

The inlet ducting includes an inlet manifold 33 coupled to the blower 32 for re-directing the flow of air into the bottom end of each one of the hollow tubular legs 22 supporting the hopper bottom wall above the ground. The flow is then directed upwardly through the hollow tubular interior of the legs through a corresponding opening located in the hopper bottom wall in alignment with the tubular passage in each leg for communicating the flow of ventilation air upwardly into the bin through the bottom end adjacent the periphery thereof.

The inlet ducting further includes a plurality of upright inlet ducts 34 extending into the interior of the bin from the bottom end. Each upright inlet duct 34 is in communication with a respective one of the passages in the legs or by other connection to the manifold 33 to receive the flow of ventilation air therein. The inlet ducts 34 each comprise a columnar tube extending vertically upward along an inner side of the cylindrical side wall 24 such that the inlet ducts are evenly spaced about the circumference of the bin with each duct spanning substantially the full height of the side wall of the bin between the top and bottom ends thereof.

Each upright inlet duct 34 defines a vertical air passage therethrough from the bottom end to the top end which is open to the upper portion of the interior of the bin defined by the top wall. A plurality of intermediate ventilation openings 36 are formed at vertically spaced positions along each of the inlet ducts in which each outlet directs a flow of air downwardly and inwardly into the bin from the perimeter radially inward towards the central portion of the bin. In some embodiments, each upright inlet duct 34 may include a single ventilation opening 36, spaced below the top end of the duct, or alternatively any other suitable arrangement of openings which provides adequate distribution of aeration flow through the hollow interior of the storage bin.

Each inlet duct 34 may further comprise perforations of various forms for communicating additional ventilation air into the interior of the bin at the perimeter thereof. In preferred arrangements the upright inlet ducts 34 remain substantially non-perforated with the exception of the ventilation openings 36. In either instance however, the inlet ducts are arranged such that the primary flow of ventilation air is directed upwardly to the top end of the bin enclosed by the sealed lid 30 to redirect the air downwardly through the center of the bin.

The exhaust ducting includes a primary exhaust duct 38 in the form of a tubular member centrally located within the storage bin in a vertical orientation. An inverted cone 40 encloses the top end of the tubular member while the side wall of the tubular member is perforated to permit ventilation air directed downwardly and radially inwardly through the particulate material in the bin to be conveyed through the perforations and into the tubular passage defined by the primary exhaust duct. The perforations define a perforated portion of the exhaust ducting and collectively define an exhaust opening in communication with the hollow interior of the storage bin at a location which is generally centered in the radial direction relative to the upright perimeter wall of the storage bin. The exhaust opening defined by the perforated portion of the exhaust ducting may also be generally central in elevation by being spaced above the bottom end of the bin and spaced below the top end of the bin. The bottom end of the primary duct 38 is spaced above the central discharge opening of the hopper bottom substantially at the same elevation as the bottom end of the cylindrical side wall.

The exhaust ducting further includes an exhaust portion which is at least partially defined by a plurality of auxiliary exhaust ducts 42 which communicate from the bottom end of the primary duct 38 to the bottom wall 14 of the bin. More particularly, the exhaust ducts connect to the bottom end of the primary exhaust duct at a laterally central location within the bin at the top end of the ducts 42 and communicate through the bottom wall 14 of the bin at laterally offset or radially outward and circumferentially spaced positions about the central discharge opening of the hopper bottom wall at a bottom end of the auxiliary ducts 42. The bottom ends of the exhaust ducts may be simply vented to atmosphere through the bottom wall.

Turning now more particularly to the first embodiment of FIG. 1, all of the incoming aeration flow in this instance is directed upwardly into the upright inlet ducts 34. Furthermore, the primary exhaust tube 38 is perforated along the full thereof in this instance to draw aeration flow inwardly along the full length thereof for being subsequently exhausted through the exhaust ducts 42 of the exhaust portion.

Figure 2:
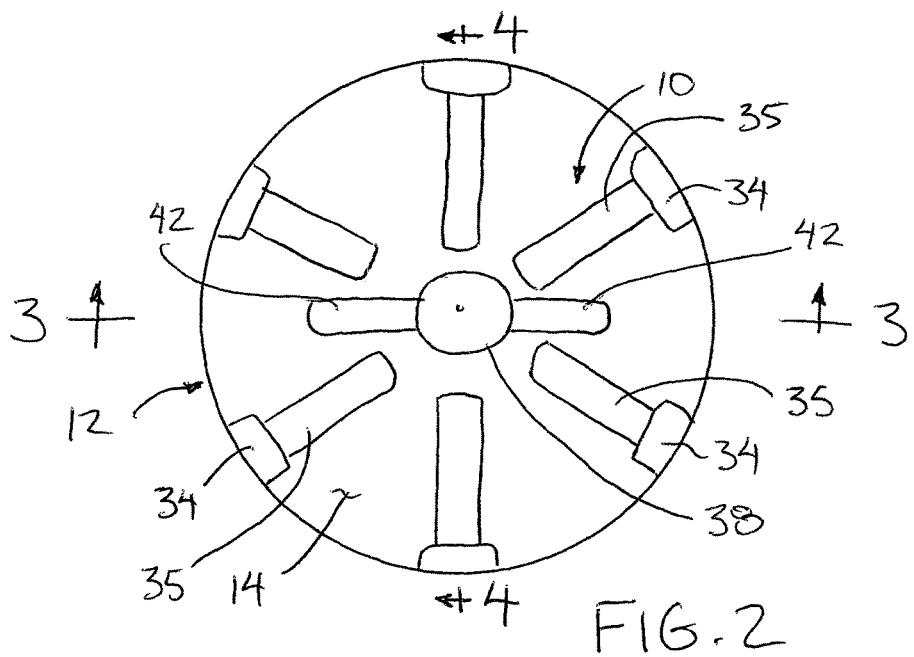
FIG. 2 is a top plan view of a second embodiment of the aeration system installed on a hopper bottom grain storage bin with the top wall of the bin shown removed.
Figure 3:
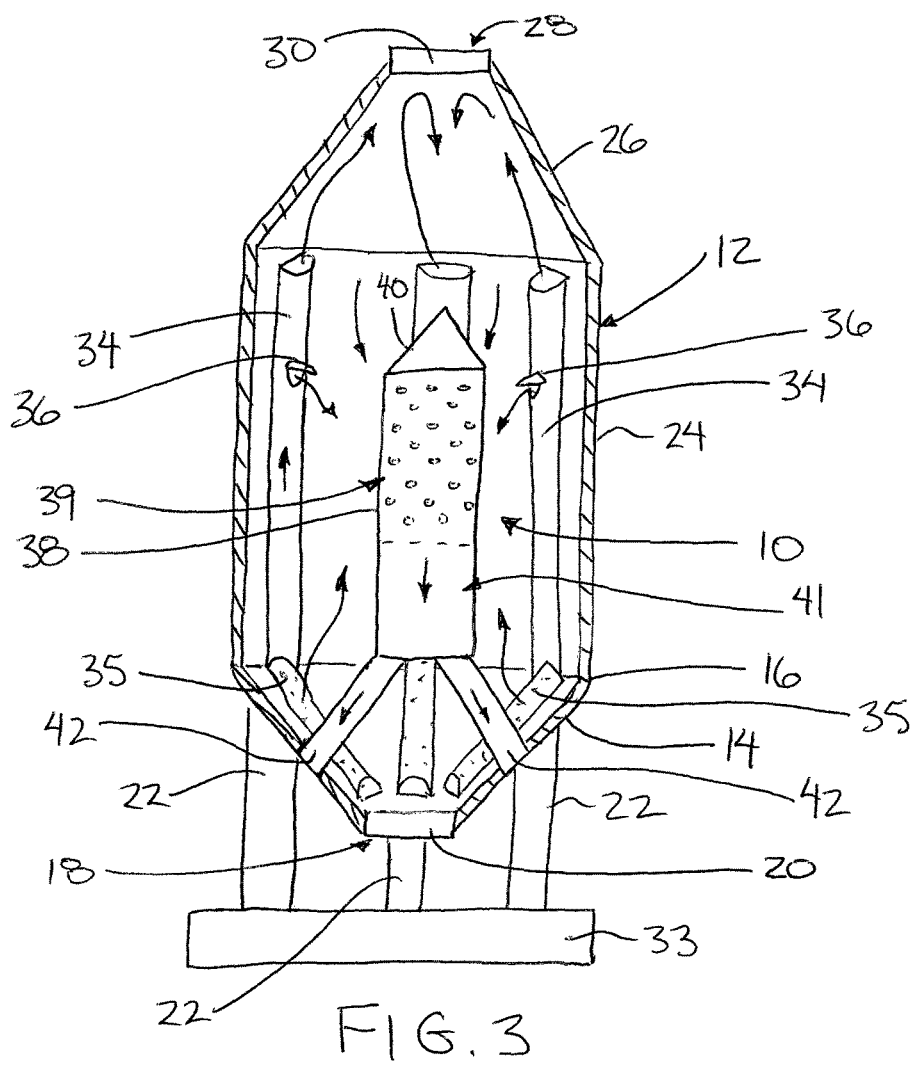
FIG. 3 is a sectional view along the line 3-3 of the aeration system according to the second embodiment of FIG. 2.
Figure 4:
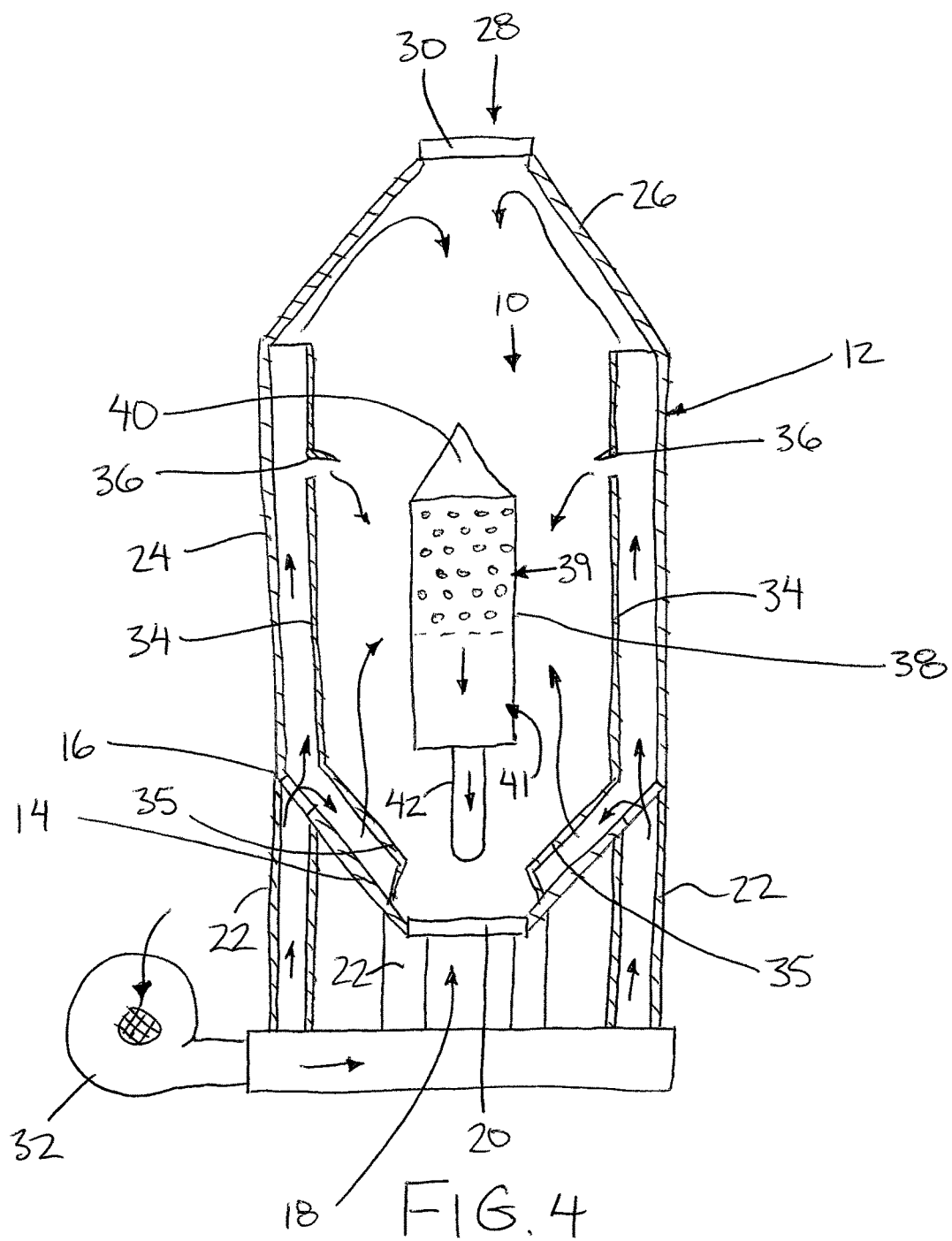
FIG. 4 is a sectional view along the line 4-4 of the aeration system according to the second embodiment of FIG. 2.

Turning now to the second embodiment of FIGS. 2 through 4, the inlet ducting in this instance includes both the upright inlet ducts 34 described above as well as additional lateral ducts 35 extending downwardly and inwardly from the perimeter wall of the storage bin along the hopper bottom wall 14 towards the central discharge 18 thereof. More particularly, the inlet ducts 34 in this instance comprise channels which extend vertically along the inner surface of the upright perimeter wall of the bin at circumferentially spaced positions.

The bottom ends of the upright inlet ducts 34 again communicate with respective ones of the legs 22 such that the passageway of each leg 22 communicates through a respective opening in the hopper bottom wall at the top end of the leg in alignment with the bottom end of a respective one of the inlet ducts 34 extending upwardly therefrom.

In the second embodiment, the inlet ducts remain substantially non-perforated along the height thereof with the exception of one or more ventilation openings 36 so that the majority of the aeration flow communicated into the upright inlet ducts 34 is directed through the top ends of the ducts towards the top end of the bin structure where the sealed bin lid 30 redirects the aeration flow downward towards the exhaust ducting. The top ends of the inlet ducts 34 may be shielded by a suitable hood or a perforated panel and the like to prevent the entry of grain therein while permitting the aeration flow to be directed upwardly from the top ends of the ducts towards the top end of the bin.

As shown in the figures, each ventilation opening 36 may be provided with a hooded portion projecting from the respective channel forming the inlet duct into the hollow interior of the storage bin immediately above the ventilation opening. The hood structure prevents the entry of particulate material into the inlet duct through the ventilation opening while also serving to direct air flow through the ventilation opening laterally inwardly and downwardly towards the exhaust opening of the exhaust ducting therebelow.

The inlet ducting of the second embodiment further includes the addition of lateral channels 35. In particular, each lateral channel 35 communicates from an outer end at the perimeter side wall in communication with a respective one of the inlet ducts 34, or more directly with a respective one of the passageways in the legs 22 by an opening through the bottom wall of the housing. Each lateral channel 35 comprises a perforated tube or perforated channel which defines a passageway therein which extends downwardly and radially inwardly along the upper surface of the hopper bottom wall from the outer perimeter boundary of the storage bin to respective inner ends in proximity to the discharge 18 of the hopper bottom.

The perforations in the lateral channels 35 permit any aeration flow directed therein to be communicated upwardly through the perforations into the hollow interior of the bin from a location below the exhaust opening of the exhaust ducting. Accordingly, any aeration flow directed into the lateral channels 35 is in turn directed into the bottom end of the storage bin for being subsequently directed upwardly through the material stored in the bin towards the exhaust opening of the exhaust ducting located thereabove.

The flow area and communication area of the upright inlet ducts 34 with the hollow interior of the bin is arranged to be greater than the corresponding flow area or communication area of the lateral channels 35 with the hollow interior of the bin such that a majority of the aeration flow is directed upwardly through the inlet ducts towards the top end of the bin as compared to the secondary flow directed downwardly through the lateral channels 35 to the bottom end of the bin. Accordingly, a majority of the aeration flow through the material within the hollow interior through the storage bin is in a downward direction from the top end of the bin towards the centrally located exhaust opening of the exhaust ducting as compared to the upward flow from the bottom end.

The second embodiment is also distinguished from the first embodiment by the arrangement of the primary central tube 38 of the exhaust ducting which instead comprises an upper portion 39 which is perforated and a lower portion 41 which is substantially non-perforated. The overall perforations of the upper portion 39 collectively define the exhaust opening of the exhaust ducting which is the overall communication area between the exhaust ducting and the hollow interior of the storage bin. The collective exhaust opening defined by the perforations in the upper portion 39 is located at a radially central location as in the previous embodiment. The exhaust opening of the exhaust ducting in communication with the hollow interior of the bin may also be in proximity to the vertical center of the bin or spaced slightly therebelow to encourage most of the aeration flow through the hollow interior of the bin being downward towards the exhaust ducting.

The remaining lower portion 41 of the primary central tube 38 remains substantially non-perforated so as to direct the exhaust flow therethrough downwardly from the upper portion 39 thereabove to the auxiliary ducts 42 therebelow. Similarly to the previous embodiment the auxiliary ducts 42 direct exhaust flow therethrough from the primary central tube 38 at the central location within the storage bin to respective outlets communicating through the hopper bottom wall at respective locations which are offset laterally outward relative to the central location so as to be spaced radially outward at circumferentially spaced locations relative to the central discharge 18 of the hopper bottom.

The non-perforated lower portion 41 of the exhaust ducting together with the auxiliary ducts 42 collectively define a non-perforated exhaust portion of the exhaust ducting through which all flow is directed downwardly from the upper portion 39 at the central location in the hollow interior of the storage bin to the outlets in the hopper bottom wall communicating externally to the exterior of the storage bin.

According to the second embodiment, the upright inlet ducts 34 define a first portion of the inlet ducting which communicates into the hollow interior of the storage bin primarily above the central location of the exhaust opening of the exhaust ducting such that a first portion of the aerating flow from the blower is subsequently directed downwardly through the hollow interior of the storage bin from the first portion of the inlet ducting to the exhaust ducting.

The lateral channels 35 thus define a second portion of the inlet ducting which communicates into the hollow interior of the storage bin at a location below of the exhaust ducting so as to direct a second portion of the aerating flow from the blower upwardly through the hollow interior of the storage bin from the second portion of the inlet ducting to the exhaust ducting. In preferred arrangements, the first portion of the ducting has greater communication with the hollow interior of the storage bin than the second portion of the inlet ducting such that the aerating flow is directed primarily downwardly through the particulate material in the hollow interior of the storage bin.

In operation, when it is desired to aerate the contents of the storage bin, the lid is properly sealed in an air tight configuration relative to the top wall of the bin and the blower is activated to generate a flow of ventilation air through the manifold 33 and legs 22 to be subsequently directed into the bin upwardly through the bottom end at circumferentially spaced positions about the perimeter. Some of the air is directed up to the top end of the bin along the perimeter side wall while another portion of air is introduced into the grain through the intermediate outlets 36 at various heights along the perimeter at circumferentially spaced positions. Yet another portion of the aeration flow is directed through the lateral channels at the bottom of the bin into the hollow interior of the bin according to the second embodiment. In either instance, the air conveyed to the top end of the bin or the intermediate outlets is subsequently directed downwardly and radially inwardly through the particulate material stored in the bin until it reaches the perforations in the primary exhaust duct 38 where the air has been permitted to flow substantially unrestricted downwardly through the primary exhaust duct and subsequently through the auxiliary exhaust ducts 42 to the exterior of the bin through the bottom end thereof. Additional aeration flow is directed upwardly through the material in the bottom end of the bin to the exhaust ducting in the instance of lateral channels as in the second embodiment. By locating the bottom end of the primary exhaust duct 38 spaced above the central discharge opening and by locating the auxiliary exhaust ducts 42 at circumferentially spaced positions radially outward from the central discharge opening, the central discharge opening remains effective at discharging contents of the bin therethrough once aeration is complete and it is desired to empty the bin.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A method of aerating an organic particulate material stored within a hollow interior of a storage bin, the storage bin having a hopper bottom wall spanning a bottom side of the hollow interior, an upright wall extending upwardly from the hopper bottom wall about a perimeter of the hollow interior, and a top wall at a top end of the upright wall enclosing a top end of the hollow interior in which the hopper bottom wall tapers downwardly and inwardly from the upright wall to a central discharge gate adapted to selectively discharge the particulate material from the hollow interior therethrough, the method comprising:

directing an aerating flow into the organic particulate material in the hollow interior of the storage bin adjacent a perimeter of the storage bin at one or more locations spaced upwardly from a bottom end of the storage bin;

providing a primary exhaust duct at a central location within the hollow interior of the storage bin so as to receive the aerating flow therein from the organic particulate material; and exhausting said aerating flow from the primary exhaust duct of the storage bin externally of the storage bin through the hopper bottom wall at the bottom end of the storage bin at a location offset laterally outwardly from the central discharge gate such that the aerating flow is directed downwardly through the primary exhaust duct.

2. The method according to claim 1 including sealing a lid of the bin closed such that the aerating flow is only exhausted through the bottom end of the storage bin.

3. The method according to claim 1 including directing the aerating flow into the hollow interior upwardly through the bottom end of the bin towards the top end of the bin alongside the perimeter of the storage bin.

4. The method according to claim 1 including providing passageways extending upwardly alongside an inner surface of a perimeter wall of the storage bin from the bottom end towards the top end and directing the aerating flow upwardly through the passageways.

5. The method according to claim 1 including directing the aerating flow into the hollow interior of the storage bin at a plurality of vertically and circumferentially spaced apart locations about the perimeter of the storage bin.

6. The method according to claim 1 including directing a primary portion of said aerating flow into the interior of the storage bin towards the top end of the storage bin.

7. An aeration system in combination with a storage bin for aerating an organic particulate material stored within a hollow interior of the storage bin, the storage bin comprising a hopper bottom wall spanning a bottom side of the hollow interior, an upright wall extending upwardly from the hopper bottom wall about a perimeter of the hollow interior, and a top wall at a top end of the upright wall enclosing a top end of the hollow interior in which the hopper bottom wall tapers downwardly and inwardly from the upright wall to a central discharge gate adapted to selectively discharge the particulate material from the hollow interior therethrough, the aeration system comprising:
   inlet ducting in communication with the hollow interior of the storage bin adjacent a perimeter of the storage bin at one or more locations spaced upwardly from a bottom end of the storage bin;
   a blower coupled to the inlet ducting so as to be arranged to direct an aerating flow into the hollow interior of the storage bin through the inlet ducting; and
   exhaust ducting in communication with the hollow interior of the storage bin and communicating externally of the storage bin so as to be arranged to exhaust the aerating flow from the hollow interior of the storage bin externally of the storage bin;
   the exhaust ducting comprising:
      a primary exhaust duct at a central location within the storage bin such that the aerating flow is directed through the organic particulate material in the hollow interior of the storage bin from the inlet ducting adjacent the perimeter of the storage bin to the primary exhaust duct at the central location within the storage bin; and
      at least one auxiliary exhaust duct communicating from the primary exhaust duct to the hopper bottom wall at a location offset laterally outwardly from the central discharge gate so as to exhaust the aerating flow from the primary exhaust duct downwardly through the hopper bottom wall.

8. The system according to claim 7 wherein the primary exhaust duct of the exhaust ducting comprises a perforated portion at said central location within the storage bin and said at least one auxiliary exhaust duct consists of a non-perforated, exhaust portion communicating from the perforated portion to an exterior of the storage bin.

9. The system according to claim 8 wherein the exhaust portion is oriented to direct exhaust flow downwardly therethrough from said central location within the bin to an exterior of the storage bin.

10. The system according to claim 7 wherein the inlet ducting includes a plurality of upright channels extending upwardly along the upright wall of the storage bin at circumferentially spaced apart positions which are in communication with the blower so as to be arranged to direct respective portions of the aerating flow upwardly therethrough towards a top end of the storage bin.

11. The system according to claim 10 wherein the upright channels are substantially non-perforated so as to be arranged to direct the aerating flow upwardly therethrough primarily to the top end of the storage bin.

12. The system according to claim 10 wherein each upright channel includes at least one ventilating opening formed therein at an intermediate location spaced below the top end thereof.

13. The system according to claim 12 wherein said at least one ventilating opening includes a hooded portion projecting from the respective channel into the hollow interior of the storage bin above the ventilating opening so as to be arranged to direct airflow through the ventilating opening downwardly and laterally inwardly.

14. The system according to claim 7 wherein the inlet ducting includes a plurality of lateral channels extending downwardly along the hopper bottom wall of the storage bin from an outer end at the perimeter of the hollow interior which is in communication with the blower so as to be arranged to direct respective portions of the aerating flow downwardly and laterally inwardly therethrough towards the hollow interior of the storage bin.

15. The system according to claim 14 wherein the lateral channels are perforated.

16. The system according to claim 7 wherein the inlet ducting further comprises:
   a first portion in communication with the hollow interior of the storage bin above said central location so as to direct a first portion of the aerating flow from the blower downwardly through the hollow interior of the storage bin from the first portion of the inlet ducting to the primary exhaust duct of the exhaust ducting at said central location; and
   a second portion in communication with the hollow interior of the storage bin below said central location so as to direct a second portion of the aerating flow from the blower upwardly through the hollow interior of the storage bin from the second portion of the inlet ducting to the primary exhaust duct of the exhaust ducting at said central location.

17. The system according to claim 16 wherein the first portion of the inlet ducting has greater communication with the hollow interior of the storage bin than the second portion of the inlet ducting such that the aerating flow is directed primarily downwardly through the organic particulate material in the hollow interior of the storage bin.

18. The system according to claim 7 further comprising a lid operably associated with a central inlet opening in the top wall of the storage bin so as to be movable between an open position in which the central inlet opening is substantially unobstructed by the lid and a closed position in which the central inlet opening is sealed by the lid such that the aerating flow can only be exhausted through the hopper bottom wall of the storage bin.

* * * * *